Aug. 23, 1927.
E. H. GOLD ET AL
1,639,772
SUSPENSION DEVICE FOR FLEXIBLE JOINTS
Filed March 18, 1926
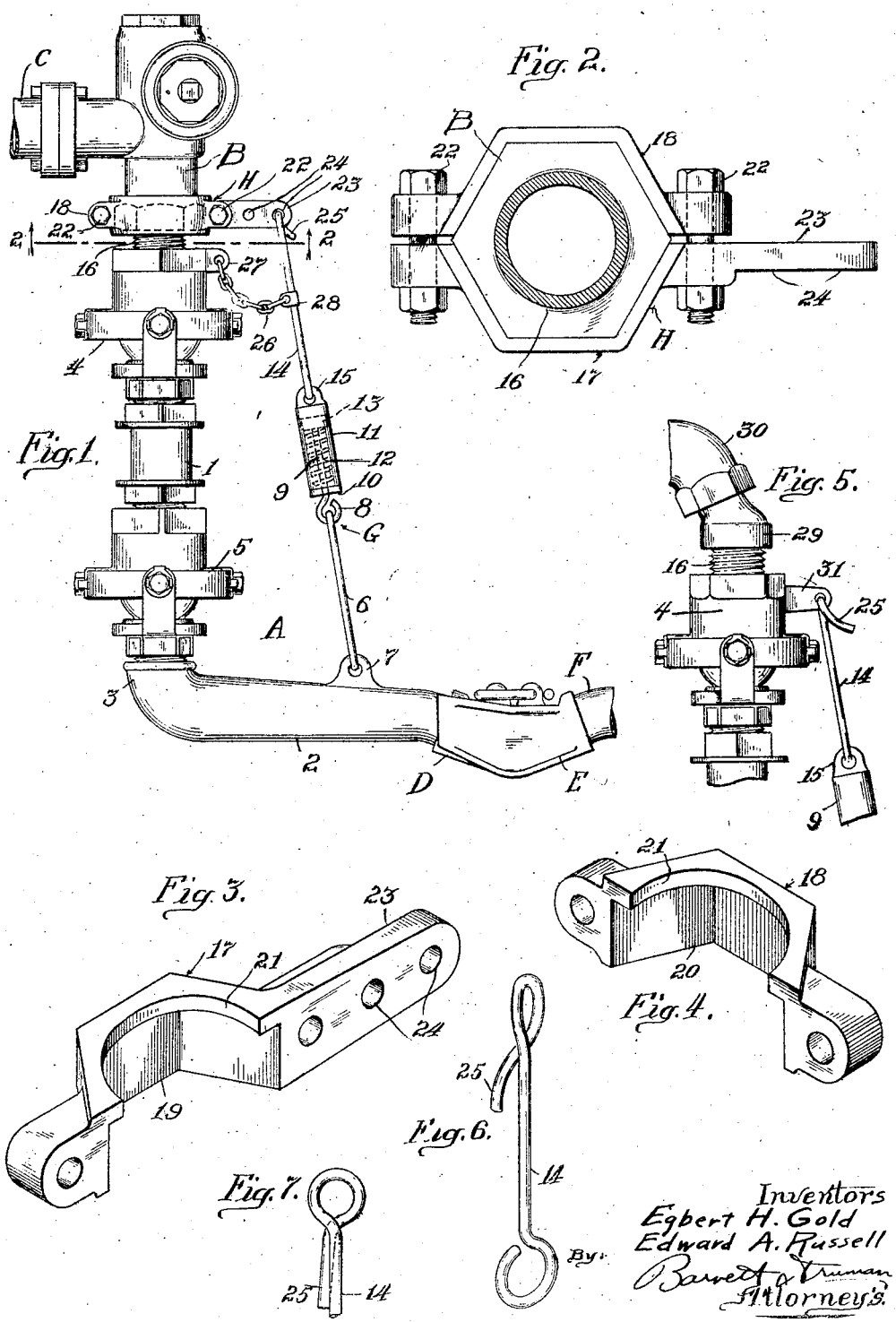
Inventors
Egbert H. Gold
Edward A. Russell
By Barrett & Truman
Attorneys

Patented Aug. 23, 1927.

1,639,772

UNITED STATES PATENT OFFICE.

EGBERT H. GOLD, OF EVANSTON, AND EDWARD A. RUSSELL, OF CHICAGO, ILLINOIS; SAID RUSSELL ASSIGNOR OF HIS ONE-HALF TO VAPOR CAR HEATING COMPANY, INC., OF CHICAGO, ILLINOIS, A CORPORATION OF NEW YORK.

SUSPENSION DEVICE FOR FLEXIBLE JOINTS.

Application filed March 18, 1926. Serial No. 95,806.

Our invention relates to a conduit or tubular structure consisting of metal elements flexibly articulated so as to form a fluid tight connection between the train pipes of the adjacent cars of a railroad train to take the place of the rubber hose ordinarily used for this purpose. The complete connection consists, in each case, of two flexible structures, one for each of the train pipes to be connected, these structures being coupled together by any suitable means, for example, the couplers such as are used with the rubber hose heretofore generally employed for making this connection.

When the car is at the end of the train, the pipe connecting structure at the rear extremity of the car will, obviously, have no mating element to be coupled with, and in such cases it is usual to provide on the end of the car, a chain or cord with a hook or like device, for engagement with the coupler, to hold the same away from the roadbed. If this were not done, the connecting structure might be broken or otherwise damaged by contact with the ties or other parts of the track or roadbed. Frequently, through carelessness, the trainmen fail to hook up the pipe connections at the rear end of the train and while the failure to do this is likely to cause trouble even when rubber hose are used, it is particularly objectionable when the connection consists of an articulated metal structure which is relatively costly, and very flexible, so that it will hang low from the car when uncoupled, the construction being easily damaged by contact with obstructions.

One of the principal objects of this invention is to provide a simple device for permanently supporting the outer end of a pipe connecting structure of the type mentioned, and holding the same at a safe distance above the roadbed, in combination with a pipe connecting structure so formed that when thus supported the structure will have requisite flexibility, first, to permit the engagement and disengagement of the couplers, and second, to allow the articulated members a range of movements necessary in order that the connection may accommodate itself to the movements of the car with respect to the adjacent car when the train rounds curves or passes over inequalities in the track. A flexible conduit structure of this type, together with one form of flexible supporting means for the lower outwardly extending end of this flexible conduit is disclosed and claimed in our copending application, Serial No. 544,448, filed March 17, 1922, now Patent 1,589,801, granted June 22, 1926.

Another object of this invention is to provide an improved form of supporting means for the upper end of the flexible supporting device. This means is here shown in the form of a detachable bracket, which is clamped to the end train pipe valve from which the articulated conduit structure is supported. This bracket embodies an outwardly extending arm, normally projecting over the outwardly extending portion of the flexible conduit, whereby the point of suspension for the conduit is brought more nearly over the center of gravity thereof.

Another object is to provide an auxiliary loose connection between the upper end of the flexible conduit member, and the supporting bracket, whereby this upper portion of the flexible conduit will be supported in case it should be accidentally broken loose or disconnected from the supporting portion of the car train pipe. Another object is to provide an improved hooked connection for the upper end of the flexible supporting device, whereby it may be easily engaged with the supporting bracket without danger of accidental disconnection therefrom.

Other objects and advantages of this invention will be more apparent from the following detailed description of certain approved forms of the apparatus involving the principles of this invention.

In the accompanying drawings:

Fig. 1 is an elevation of the assembled flexible conduit, and its flexible supporting device, when operatively mounted on the car and supported from the end train pipe valve.

Fig. 2 is a bottom plan view of the supporting bracket, the view being taken substantially on the line 2—2 of Fig. 1, looking in the direction of the arrows.

Figs. 3 and 4 are perspective views of the two clamping members which are bolted together to form the bracket.

Fig. 5 is an elevation of the upper portion of a modified form of the apparatus.

Figs. 6 and 7 are detail elevations of the attaching hooks, Fig. 7 being taken at right angles to the plane of Fig. 6.

Fig. 1 shows at A one of the complete flexible conduit assemblies, as suspended from the end train pipe valve B mounted at the end of the car train pipe C, the conduit structure A carrying at its free end a coupler D, adapted to be joined to a similar mating coupler E, carried by a flexible conduit structure F, similar to conduit structure A, and carried by the adjacent car. It will be understood, however, that assuming the use of a standard type of coupler, the connecting device or flexible conduit of our invention might be coupled up with any other sort of connecting device, such, for example, as the rubber hose type of connection, heretofore commonly used upon the steam or air train pipes of railway cars.

The flexible metallic conduit structure, as here shown, comprises an intermediate vertically disposed conduit section 1, and a lower normally horizontally disposed conduit section 2. Conduit 2 carries the coupler D at its outer free end, and its inner end is turned upwardly as at 3, for connection with the lower end of the vertical conduit member 1. Conduit member 1 is connected at its respective ends to a pair of similar flexible joint connections 4 and 5, the flexible joint 4 serving to connect the upper end of conduit 1 with the end train pipe valve B, and the flexible joint 5 serving to connect the lower end of conduit member 1 with the upturned inner end 3 of the conduit member 2. The flexible joints 4 and 5 may be of any suitable form which will permit the unrestricted flow of fluid therethrough, maintain fluid tight joints at the connections, and permit universal angular movements and swiveling movements between the several sections of the conduit structure. The approved type of flexible joints herein generally disclosed, are shown and described, more in detail, and claimed in our copending application, Serial No. 95,805, hereinabove referred to. These flexible joints 4 and 5 will permit almost complete freedom of movement of the coupler D, whereby the coupler may be easily engaged and disengaged from the mating coupler on the adjacent car, and whereby the joined conduit members may swing freely to accommodate themselves to the movements of the cars.

It will be apparent that the flexibility of this conduit structure, as just described, would permit the coupler D, when unconnected with a mating coupler, to swing downwardly into engagement with the ties or roadbed. In order to prevent this, the supporting device shown generally at G, is provided. This supporting means is so constructed and arranged as to allow the flexibility at the articulations of the conduit structure requisite for coupling and uncoupling the same, and for giving the structure the capacity to adapt itself to the relative shifting movements of the cars between which the connection is located. The ends of the adjacent cars of a railway train may rise and fall, one with respect to the other, may be displaced angularly, one from another, and in the starting up and stopping of the train, may recede from and approach one another. In order to permit these movements, the flexible conduit structure is articulated and swiveled as hereinabove described, and it is essential that the supporting device G possess such flexibility as not to interfere with these movements when the flexible conduit device is connected in service. As here shown, this flexible supporting device G comprises a link 6 connected at its lower end to a perforated lug or eye 7 on the horizontal conduit member 2, and connected at its upper end to an eyelet 8 at the lower end of a shank 9. This shank 9 is slidable through an opening in the head 10 of a spring casing 11, enclosing the compression spring 12, which is confined between the head 10 of the casing 11 and the head 13 on the upper end of the shank 9. An upper link 14 is flexibly connected at its lower end to an eye 15 on the upper end of spring casing 11. The upper end of link 14 is suitably anchored to some fixed support, preferably the improved supporting bracket hereinafter described. This device G is of such length that it will not interfere with the free movements of the coupler D, nor materially support same when connected in service, but will act as a support for the coupler D and the conduit member 2 when disconnected from the adjacent car. The interposed spring 12 permits the supporting member to stretch to a certain extent under stress developed by the relative movements of the cars.

In previous forms of this device, the upper end of the link 14 has been anchored to a projection on the upper portion of the flexible joint 4, or to a member supported thereby, or to some adjacent portion of the car. This arrangement possessed certain disadvantages which the present invention is designed to overcome. In order to prevent the flexible conduit structure from swinging backwardly, that is to the left in Fig. 1, an undesirable distance, it is preferable to have the supporting point for the flexible device G more nearly over the center of gravity of the flexible conduit structure, which will obviously be somewhere over the horizontally extending conduit 2, and to the right of the vertically extending conduit member 1 as shown in Fig 1. Also, the weakest point in this structure is probably the fitting 16, whereby the entire flexible conduit structure is connected with and supported from the end train pipe valve B. If this flexible conduit structure should be accidentally broken away, the fracture is more apt to occur at this connection 16, and if the flexible supporting device G were connected below this member 16, the entire flexible conduit structure will fall away and be lost after such breakage.

According to this present improvement, a supporting bracket H is connected to the lower end portion of the end train pipe valve B. This bracket H comprises two somewhat similar halves 17 and 18, shown respectively in perspective in Figs. 3 and 4. These bracket members are formed internally at 19 and 20 to fit about the irregular, nut-shaped lower end portion of the valve body B, and have inturned flanges 21 at their upper ends to fit over the top of this portion of valve B. The two halves of the bracket are clamped together about the valve B by means of the bolts 22. One member of the bracket, as here shown the member 17, is provided with an outwardly extending arm 23 provided with one or more openings 24, in which can be hooked the upper end 25 of the link 14. The arm 23 projects outwardly over the normal position of the horizontally extending conduit member 2, and by suitably proportioning the parts, the pivotal support 24 for the upper end of the flexible supporting member G may be placed substantially over the center of gravity of the flexible conduit structure, so that this structure will not swing back to any undesirable extent when disconnected from the adjacent car.

The hook 25 at the upper end of link 14 is preferably of an approximately spiral shape, being bent around as best shown in Figs. 6 and 7. The hook is not engaged with the bracket arm 23 until the flexible structure has been assembled on the car. The engagement between the hook and opening 24 is made by raising the outer end of the flexible structure so as to slacken the connector. The peculiar configuration of the hook prevents the hook from being accidentally disengaged. It cannot easily be disengaged, either accidentally or intentionally while the coupler D is coupled up with the mating coupler E.

It will be noted that should the flexible conduit structure be broken away at the fitting 16 (for example along the line 2—2 in Fig. 1), the flexible supporting device would remain in service, and would support the lower portion of the flexible conduit structure. However, there would be nothing to prevent the upper portion of the flexible conduit structure from falling down, and to prevent this, we have provided an auxiliary connection between the upper portion of the flexible conduit structure and the supporting valve B. As here shown, a normally loosely hanging, short chain section 26 is connected at one end to a lug 27 on the upper portion of flexible joint 4, and is secured at its other end 28 to the upper link 14. This chain 26 is normally loose and inactive, but in case of breakage at the point 16, this chain would serve to support the upper portion of the flexible conduit structure and prevent its falling far enough to encounter any obstructions and become further damaged. The auxiliary chain 26 might be connected directly to the bracket arm 23, or to any other portion of the supporting valve B, or the adjacent car structure, but the connection here shown is preferably, since it facilitates the assembly of the device as a unit, and simplifies its attachment to the car.

The entire flexible conduit structure, including the coupler D, the flexible supporting device G, and the auxiliary supporting means 26, may be assembled as a unit, prior to mounting the same on the car. This unit is then attached at 16 to the end train pipe valve B, and the bracket H is bolted in place about the lower end of the valve. The hook 25 is then attached in the opening 24 in arm 23 and the device is ready for service.

By using a suitable union or adapter at the point 16, and by suitably varying the conformation of the clamping brackets 17 and 18, this same flexible conduit structure could be mounted on other types or sizes of end train pipe valves than the one here shown by way of example. In Fig. 5 is shown a modified construction in which an adapter 29 is used to connect the flexible conduit structure with an end train pipe valve 30. As here shown, the supporting bracket has been omitted, and the hook 25 at the upper end of link 14 is connected to a supporting arm or lug 31 projecting outwardly from the upper portion of the flexible joint member 4. By making this supporting arm 31 of suitable length, some of the advantages of the supporting bracket 23 could be obtained, but this simplified construction would be unable to function in case of breakage as has been described in connection with the preferred form first disclosed.

We claim:

1. In a flexible metallic conduit structure adapted, when coupled with another conduit structure, to make the connection between the train pipes on adjacent cars of a railway train, the combination of a plurality of tubular elements flexibly articulated, and a flexible supporting member for holding up the lower outwardly projecting portion of said structure when uncoupled, said supporting member being attached at its lower end to the outer end of the structure, and a supporting bracket for the upper end of the flexible supporting member comprising an arm projecting outwardly above the outwardly projecting portion to a point substantially over the center of gravity of the conduit structure, the flexible supporting member being attached to the outer end of this arm.

2. In a flexible metallic conduit structure adapted, when coupled with another conduit structure, to make the connection between the train pipes on adjacent cars of a railway train, the combination of a plurality of tubular elements flexibly articulated, the upper end of this conduit structure being connected with and supported by the car train pipe, a flexible supporting member for holding up the lower outer end of the conduit structure when uncoupled, said supporting member being attached at its lower end to the outwardly projecting portion of the conduit structure, and a supporting bracket anchored to a fixed member on the car train pipe and comprising an arm projecting outwardly over the lower portion of the conduit structure to a point substantially over the center of gravity of the conduit structure and serving as a support for the upper end of the flexible supporting member.

3. In a flexible metallic conduit structure adapted, when coupled with another conduit structure, to make the connection between the train pipes on adjacent cars of a railway train, the combination of a plurality of tubular elements flexibly articulated, the upper end of this conduit structure being connected with and supported by the car train pipe, a flexible supporting member for holding up the lower outer end of the conduit structure when uncoupled, said supporting member being attached at its lower end to the outwardly projecting portion of the conduit structure, and a supporting bracket anchored to a fixed member on the car and comprising an arm projecting outwardly over the lower portion of the conduit structure and serving as a support for the upper end of the flexible supporting member, and an auxiliary normally inactive connection between the upper portion of the conduit structure and a fixed member on the car.

4. In a flexible metallic conduit structure adapted, when coupled with another conduit structure, to make the connection between the train pipes on adjacent cars of a railway train, the combination of a plurality of tubular elements flexibly articulated, the upper end of this conduit structure being connected with and supported by the car train pipe, a flexible supporting member for holding up the lower outer end of the conduit structure when uncoupled, said supporting member being attached at its lower end to the outwardly projecting portion of the conduit structure, and a supporting bracket anchored to a fixed member on the car and comprising an arm projecting outwardly over the lower portion of the conduit structure and serving as a support for the upper end of the flexible supporting member, and an auxiliary normally inactive connection between the upper portion of the conduit structure and the supporting bracket.

5. In a flexible metallic conduit structure adapted, when coupled with another conduit structure, to make the connection between the train pipes on adjacent cars of a railway train, the combination of a plurality of tubular elements flexibly articulated, the upper end of this conduit structure being connected with and supported by the car train pipe, a flexible supporting member for holding up the lower outer end of the conduit structure when uncoupled, and an auxiliary normally inactive connection between the upper end of the conduit structure and a fixed member on the car.

6. In a flexible metallic conduit structure adapted, when coupled with another conduit structure, to make the connection between the train pipes on adjacent cars of a railway train, the combination of a plurality of tubular elements flexibly articulated, and a flexible supporting member for holding up the outer end of said structure when uncoupled, said supporting member being attached at its lower end to the outer end of the structure and yieldingly extensible longitudinally and having a hook at its upper end, a member on the car with which the hook is detachably engaged, and an auxiliary normally inactive connection between the upper end of the conduit structure and the hook.

7. In a flexible conduit structure adapted, when coupled with another conduit structure, to make the connection between the train pipes on adjacent cars of a railway train, the combination of a plurality of tubular elements flexibly articulated, and a flexible supporting member for holding up the outer end of said structure when uncoupled which is permanently attached to the outer end of the structure and is yieldingly extensible longitudinally to compensate for the normal variations in distance between said cars, and has a spiral attaching hood at its upper end, the end of said hook being formed to permit detachment thereof only when the coupler is raised without extending said flexible supporting member, a member on the car with which the hook is detachably engaged, and an auxiliary normally inactive connection between the upper end of the conduit structure and the hook.

8. The combination with the end train pipe valve on a railway car, a flexible conduit structure supported from said valve and adapted to make connection with a conduit member on an adjacent car, and a flexible supporting member for the outwardly projecting portion of said conduit structure, of means for supporting the upper end of said flexible supporting member consisting of a two-part bracket adapted to fit about and be clamped to the lower portion of the train pipe valve, one bracket part having an outwardly extending arm to which the flexible supporting member is attached.

9. The combination with the end train pipe valve on a railway car, a flexible conduit structure supported from said valve and adapted to make connection with a conduit member on an adjacent car, and a flexible supporting member attached to the lower outwardly projecting portion of said conduit structure, of a bracket secured to the lower end of the pipe valve and having an outwardly projecting arm to which the upper end of the flexible supporting member is attached, and a normally loose auxiliary connection between the upper portion of the flexible conduit structure and the bracket.

10. The combination with the end train pipe valve on a railway car, a flexible conduit structure supported from said valve and adapted to make connection with a conduit member on an adjacent car, and a flexible supporting member connecting the lower outwardly projecting portion of the conduit structure with the train pipe valve, of an auxiliary normally loose flexible connection between the upper portion of the conduit structure and the pipe valve.

11. In combination with the end train pipe valve on a railway car, a flexible conduit structure adapted, when coupled with another conduit member to make connection between the train pipes on adjacent cars of a train, comprising a plurality of flexibly articulated tubular conduit elements, the uppermost conduit element being supported from the end valve and extending downwardly, and the lowermost conduit element extending substantially horizontally and provided with a coupler, and a supporting structure for holding up the horizontally extending portion of the conduit when uncoupled comprising a bracket projecting outwardly from the end valve to a point substantially over the center of gravity of the conduit structure, and a flexible supporting member connecting this projecting end of the bracket with the horizontally extending conduit member.

12. In combination with the end train pipe valve on a railway car, a flexible conduit structure adapted, when coupled with another conduit structure to make connection between the train pipes on adjacent cars of a train, comprising a plurality of flexibly articulated tubular conduit elements, the uppermost conduit element being supported from the end valve and extending downwardly, and the lowermost conduit element extending substantially horizontally and provided with a coupler and a supporting structure for holding up the horizontally extending portion of the conduit when uncoupled comprising a bracket projecting outwardly from the end valve to a point substantially over the center of gravity of the conduit structure, and a flexible supporting member connecting the bracket with the lower conduit member, said flexible member being extensible to compensate for the normal variation in distance between the cars.

13. In combination with the end train pipe valve on a railway car, a flexible conduit structure adapted, when coupled with another conduit structure to make connection between the train pipes on adjacent cars of a train, comprising a plurality of flexibly articulated tubular conduit elements, the uppermost conduit element being supported from the end valve and extending downwardly, and the lowermost conduit element extending substantially horizontally and provided with a coupler, and a supporting structure for holding up the horizontally extending portion of the conduit when uncoupled comprising a bracket projecting outwardly from the end valve in the same direction as the lower conduit member, a flexible supporting member connecting the bracket with said lower conduit member, and an auxiliary flexible connection between the upper portion of the first mentioned flexible supporting member and the uppermost conduit member.

14. In combination with the end train pipe valve on a railway car, a flexible conduit structure adapted, when coupled with another conduit structure to make connection between the train pipes on adjacent cars of a train, comprising a plurality of flexibly articulated tubular conduit elements, the uppermost conduit element being supported from the end valve and extending downwardly, and the lowermost conduit element extending substantially horizontally and provided with a coupler, and a supporting structure for holding up the horizontally extending portion of the conduit when uncoupled comprising a bracket which is clamped to the lower end of the train pipe valve and has an arm projecting outwardly over the lower conduit member, a flexible supporting member connecting this bracket arm with said lower conduit member, said uppermost conduit member being provided with a perforated lug projecting substantially beneath said bracket arm, and a short flexible member connecting this lug with the upper portion of the first mentioned flexible supporting member.

EGBERT H. GOLD.
EDWARD A. RUSSELL.